(12) United States Patent
Throngnumchai et al.

(10) Patent No.: US 6,812,722 B2
(45) Date of Patent: Nov. 2, 2004

(54) ON-CHIP TEMPERATURE DETECTION DEVICE

(75) Inventors: Kraisorn Throngnumchai, Yokohama (JP); Yoshio Simoida, Yokosuka (JP)

(73) Assignee: Nissan Motor Co., Ltd., Kanagawa (JP)

( * ) Notice: Subject to any disclaimer, the term of this patent is extended or adjusted under 35 U.S.C. 154(b) by 133 days.

(21) Appl. No.: 10/091,305

(22) Filed: Mar. 6, 2002

(65) Prior Publication Data

US 2002/0140447 A1 Oct. 3, 2002

(30) Foreign Application Priority Data

Mar. 27, 2001 (JP) ........................................ 2001-090295

(51) Int. Cl.[7] .......................... G01R 31/26; G01K 7/01
(52) U.S. Cl. ...................... 324/760; 374/178; 702/130
(58) Field of Search ............................... 324/760, 765, 324/768, 769; 702/130; 361/103; 374/178

(56) References Cited

U.S. PATENT DOCUMENTS 4,669,026 A * 5/1987 Widlar ........................ 361/103
6,259,297 B1 * 7/2001 Galli ........................... 327/320

FOREIGN PATENT DOCUMENTS

JP          6-252408           9/1994

* cited by examiner

*Primary Examiner*—Ernest Karlsen
(74) *Attorney, Agent, or Firm*—McDermott Will & Emery LLP

(57) ABSTRACT

An on-chip temperature detection device includes: a bipolar type power transistor; a mirror transistor in which a collector current, which is proportional to a collector current of the power transistor, flows; a current detection section that detects the collector current of the mirror transistor; a voltage detection section that detects a voltage between a base and an emitter of the power transistor; and a calculation section that calculates a chip temperature of the power transistor, based upon the collector current of the mirror transistor detected by the current detection section, and upon the voltage between the base and the emitter of the power transistor detected by the voltage detection section.

7 Claims, 9 Drawing Sheets

ON-CHIP TEMPERATURE DETECTION DEVICE

BACKGROUND OF THE INVENTION

1. Field of the Invention

The present invention relates to a technique for detecting the chip temperature of a power transistor, which drives a load such as an inductive load or a resistive load, quickly, at a low cost, and at high accuracy, so that it enables the entire system to operate safely.

2. Description of the Related Art

From the past, various protective circuits have been indispensable for the proper utilization of a power transistor, such as circuits for protection from excess electrical current and for protection from excess load (excess temperature) and the like. It is per se known to utilize a mirror transistor in which flows an electrical current which is proportional to the main electrical current as a current detection means for protection from excess electrical current, and it is per se known to use a chip temperature detection means for protection from excess load. As one example of a prior art chip temperature detection means, there is a per se known method of forming a diode in a polysilicon thin film upon the surface of the power transistor, and of detecting the temperature by taking advantage of the temperature dependence of the bias voltage when a fixed electric current flows in the forward direction through said polysilicon diode. This method has the beneficial point of being easy to apply, since such a polysilicon diode is perfectly separated from the power transistor by an dielectric material, and accordingly they do not mutually interfere with one another.

SUMMARY OF THE INVENTION

However, with a prior art technique such as the one described above, it is necessary to provide separate detection means for protecting against excess electrical current and excess load, in other words it is necessary to provide both the mirror transistor and also the polysilicon diode, and as a result the problem arises that the area which is occupied upon the power transistor chip becomes large.

Furthermore, with the above described prior art, as well as it being necessary to provide a mirror emitter (or source; hereinafter this will be referred to as the emitter) terminal for the mirror transistor, it is also necessary to provide two terminals for the polysilicon diode and it is moreover necessary to attach wires to these two terminals of the polysilicon diode. With a power transistor which is adapted to deal with a high electrical current, it is particularly necessary to attach emitter wires to the bonding pad as much and densely as possible, but with the construction described above there is the problem that it is not possible to attach emitter wires densely over the portion of the circumference of the chip where the polysilicon diode wires are present.

Yet further, if a current control type element which originally does not use polysilicon is used as the power element as described in Japanese Laid-Open Patent Publication H6-252408, it is needed to provide a temperature detection means such as the above described polysilicon diode or the like. As a result, a further process is entailed which is not required in the original semiconductor element manufacturing process, so that, along with the manufacturing cost being increased, the problem arises that a stepped portion is created upon the aluminum wiring above the temperature detection element and a bad influence is exerted upon the basic characteristics of the element itself.

Moreover, the symmetry of the original layout of an element is deteriorated by the presence of the region for temperature detection, and accordingly the problem regarding the layout also arises that a bad influence being exerted upon the characteristics of the element can not be avoided.

The present invention solves problems like the ones described above with prior art techniques, and provides an on-chip temperature detection device which is capable of performing speedy on-chip temperature detection at high accuracy, while not requiring the provision of any separate temperature detection means, thus preventing increase of the number of element manufacturing processes and enlargement of the chip area.

An on-chip temperature detection device according to the present invention, comprises: a bipolar type power transistor; a mirror transistor in which a collector current, which is proportional to a collector current of the power transistor, flows; a current detection section that detects the collector current of the mirror transistor; a voltage detection section that detects a voltage between a base and an emitter of the power transistor; and a calculation section that calculates a chip temperature of the power transistor, based upon the collector current of the mirror transistor detected by the current detection section, and upon the voltage between the base and the emitter of the power transistor detected by the voltage detection section.

Another on-chip temperature detection device according to the present invention, comprises: a bipolar type power transistor that is driven by a first drive signal; a voltage detection section that detects a voltage between a base and an emitter of the power transistor; a second drive signal generation circuit that generates a second drive signal which is a different signal from the first drive signal, and which drives the power transistor so that the voltage between the base and the emitter of the power transistor is less than a predetermined voltage; and a calculation section which calculates a chip temperature of the power transistor, when the power transistor is being driven by the second drive signal, based upon at least the voltage between the base and the emitter of the power transistor detected by the voltage detection section.

Another on-chip temperature detection device according to the present invention, comprises: a bipolar type power transistor that is driven by a first drive signal; a mirror transistor in which a collector current, which is proportional to a collector current of the power transistor, flows, when the power transistor is being driven by the first drive signal; a second drive signal generation circuit that generates a second drive signal which is a different signal from the first drive signal, which flows a predetermined current in the mirror transistor so that a voltage between a base and an emitter of the mirror transistor is less than a predetermined voltage, and which drives the power transistor to be OFF; a voltage detection section that detects the voltage between the base and the emitter of the mirror transistor; and a calculation section that calculates a chip temperature of the power transistor, when the mirror transistor and the power transistor are being driven by the second drive signal, based upon at least the voltage between the base and the emitter of the mirror transistor detected by the voltage detection section.

Another on-chip temperature detection device according to the present invention, comprises: a bipolar type power transistor that is driven by a first drive signal; a mirror transistor in which a collector current, which is proportional to the collector current of the power transistor, flows, when the power transistor is being driven by the first drive signal; an OFF signal generation circuit that generates an OFF signal which turns the power transistor OFF when the first drive signal is OFF; a current drive circuit that flows a predetermined current in the mirror transistor so that a voltage between a base and an emitter of the mirror transistor is less than a predetermined voltage, when the first drive signal is OFF and the power transistor is turned OFF by the OFF signal; a voltage detection section that detects the voltage between the base and the emitter of the mirror transistor; and a calculation section that calculates a chip temperature of the power transistor, when the first drive signal is OFF and the power transistor is turned OFF by the OFF signal, based upon at least the voltage between the base and the emitter of the mirror transistor detected by the voltage detection section.

Another on-chip temperature detection device according to the present invention, comprises: a power transistor that may be a bipolar type or a MOS type including an IGBT, having a collector or drain terminal, an emitter or source terminal, and a base or gate terminal; a mirror transistor having a collector or drain terminal and a base or gate terminal which are the same, respectively, as the collector or drain terminal and the base or gate terminal of the power transistor, and a mirror emitter or mirror source terminal which is independent from the emitter or source terminal of the power transistor; a control circuit that keeps a collector or drain current which flows in the mirror transistor constant; and a calculation section that flows a predetermined current in a collector or drain of the mirror transistor only while the power transistor is OFF, that measures the voltage between the base or gate terminal and the emitter or source terminal of the mirror transistor at this time, and that calculates the chip temperature of the power transistor based on a temperature characteristic of the voltage.

Another on-chip temperature detection device according to the present invention, comprises: a power transistor that supplies a current based upon a drive signal; a mirror transistor in which flows a current which is proportional to the current being supplied by and flowing in the power transistor; a current detection means for detecting the current flowing in the mirror transistor; a voltage detection means for detecting a voltage between a drive signal input terminal and a current supply terminal of the power transistor; and a calculation means for calculating a chip temperature of the power transistor, based upon at least one of the current detected by the current detection means and the voltage detected by the voltage detection means.

DESCRIPTION OF THE PREFERRED EMBODIMENTS

First Embodiment

Figure 1:
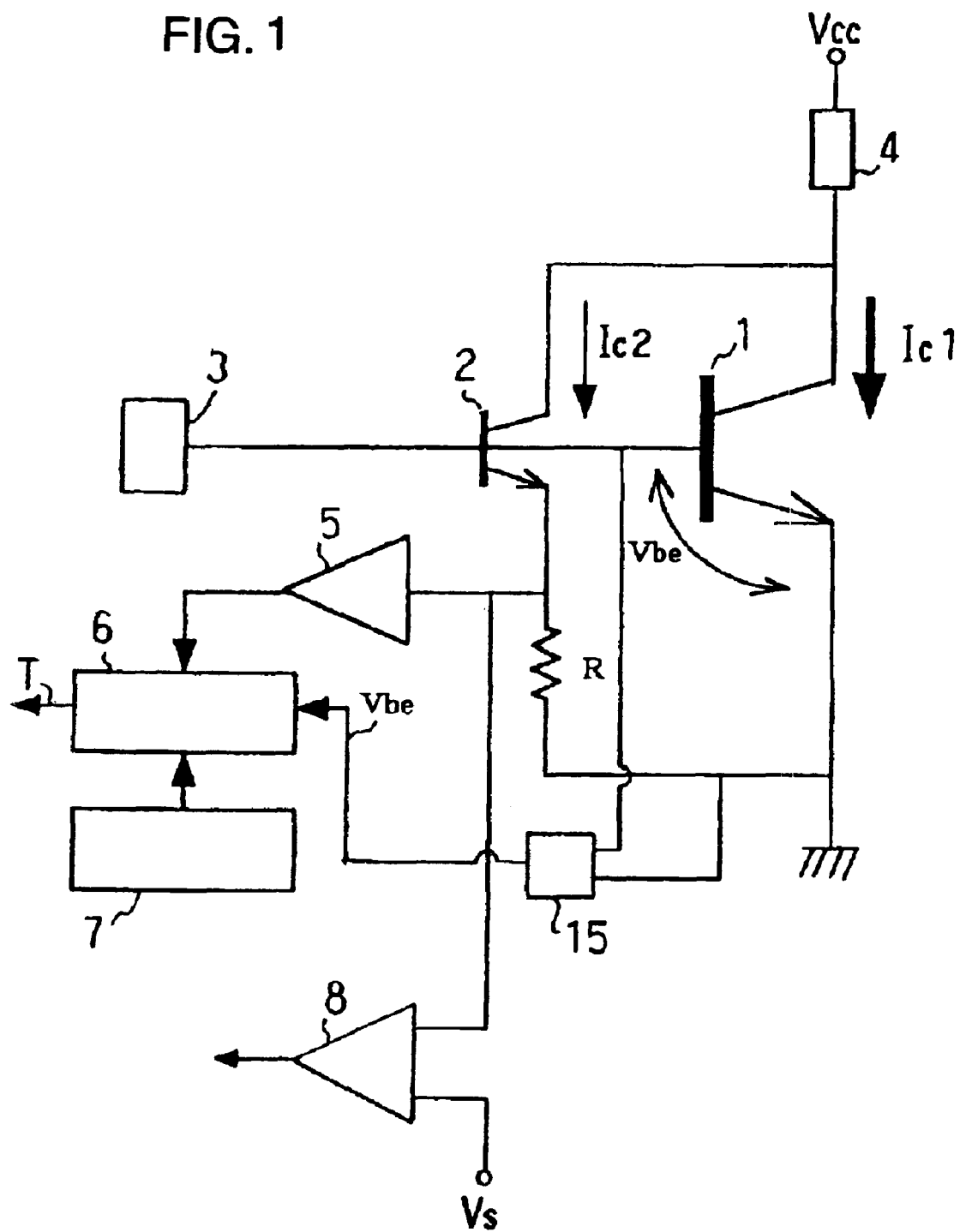
FIG. 1 is a circuit diagram showing the structure of a first preferred embodiment of the present invention.

FIG. 1 is a circuit diagram showing the structure of a first preferred embodiment of the present invention. FIG. 1 is a circuit diagram for a bipolar type power transistor which comprises a current mirror, and in this figure the reference symbol 1 denotes a power transistor, while 2 denotes a mirror transistor whose structure is the same as that of the power transistor 1 while its capacity is smaller, 3 denotes a drive circuit, 4 denotes a load (for example, an inductive load or a resistive load), 5 denotes an amplifier whose impedance is high (for example an op amp), 6 denotes a temperature calculation section, 7 denotes a memory which stores a map giving a saturation electrical current Ise as a function of temperature T, 8 denotes a comparator, R denotes a current detection resistor whose resistance value is sufficiently small, 15 denotes a Vbe detection section, Ic1 denotes the collector current of the power transistor 1, Ic2 denotes the collector current of the mirror transistor 2, and Vbe denotes the voltage between the base and the emitter of the power transistor 1 (also called the "control voltage"). It should be noted that the comparator 8 is an element which constitutes an excess current detection circuit, and it is not directly related to the temperature detection of present invention. In FIG. 1, all of the elements except the load 4 are formed on-chip.

Generally the collector current Ic of a bipolar type power transistor almost satisfies the following Equation (1):

$$Ic = Ise \exp(qVbe/nkT) \qquad (1)$$

where n is a real number greater than 1 (its value may for example be between 1 and 2), q is the charge of an electron, k is Boltzmann's constant, and T is the temperature.

The current Ise in Equation (1) is termed the saturation current, and for any particular chip it only depends upon the temperature Accordingly it is possible to measure and to store the Ise as a function of temperature for each type of chip during manufacture.

In this first preferred embodiment of the present invention, the chip temperature of the bipolar type power transistor is estimated using the above Equation (1). This will now be explained. While the power transistor 1 is ON, the current Ic1 flows in the collector of the power transistor 1, and the current Ic2 which is proportional to Ic1 flows to the collector of the mirror transistor 2. This current Ic2 flows through the current detection resistor R, and as a result a voltage is generated which is proportional to Ic2, this voltage being amplified by the amplifier 5. Ic2 can be easily measured if the mirror transistor 2 is used in this manner, and accordingly it is also possible easily to measure the collector current Ic1 which is proportional thereto. On the other hand, the voltage Vbe between the base and the emitter is detected by the Vbe detection section 15. In concrete terms, for example, if one of the two impedance terminals of an amplifier (such as an op amp) whose impedance is high is connected to the base terminal while the other is connected to the emitter terminal, then an output is obtained at the output of the amplifier which corresponds to the voltage Vbe between the base and the emitter.

It is possible to estimate the chip temperature T using the above Equation (1) if Ic and Vbe are measured in the above manner. A concrete example of the way in which this estimation is performed will be described below. First, the initial estimated value of the temperature T is taken to be T0, and Vbe0 is calculated from T0 and Ic, and then Vbe0 is compared with Vbe. If Vbe0 is greater than Vbe, then T0 is increased for the next estimated value thereof, while if Vbe0 is less than Vbe, then T0 is decreased for the next estimated value thereof; and then the calculation is performed again. The process is repeated until this calculation converges, and thereby the chip temperature T is obtained. This calculation is performed by the temperature calculation section 6.

According to the first preferred embodiment of the present invention as described above, it is possible to measure the chip temperature only using the mirror transistor 2 which is used for excess electric current protection, even though no temperature measurement means such as a polysilicon diode is provided separately. Because of this it is possible to reduce the portion of the surface area of the power transistor which is ineffective, and moreover the beneficial result is obtained that it is possible to affix the main emitter wires sufficiently densely. Furthermore the benefit is obtained that it is possible to curtail increase in the number of processes due to the provision of such polysilicon, and to eliminate all problems caused thereby.

It should be understood that the comparator 8 shown in FIG. 1 is an element which is required in the structure of the excess electric current detection circuit, and which dispatches an excess current detected signal when a voltage (the terminal voltage of the current detection resistor R) which is proportional to the collector current Ic2 (and accordingly to Ic1) becomes greater than a predetermined reference voltage Vs. In the prior art, the mirror transistor 2 was only used for the above described excess current detection function, but in the present invention, as described above, the construction also uses the same mirror transistor 2 for excess temperature detection. It should be noted that although it is not shown in the figure, a switching device may be provided for changing over the connection of the emitter of the mirror transistor 2 between the temperature detection circuit and the excess current detection circuit, since the same mirror transistor 2 is used both for detecting current and also for detecting temperature.

Second Embodiment

Figure 2:
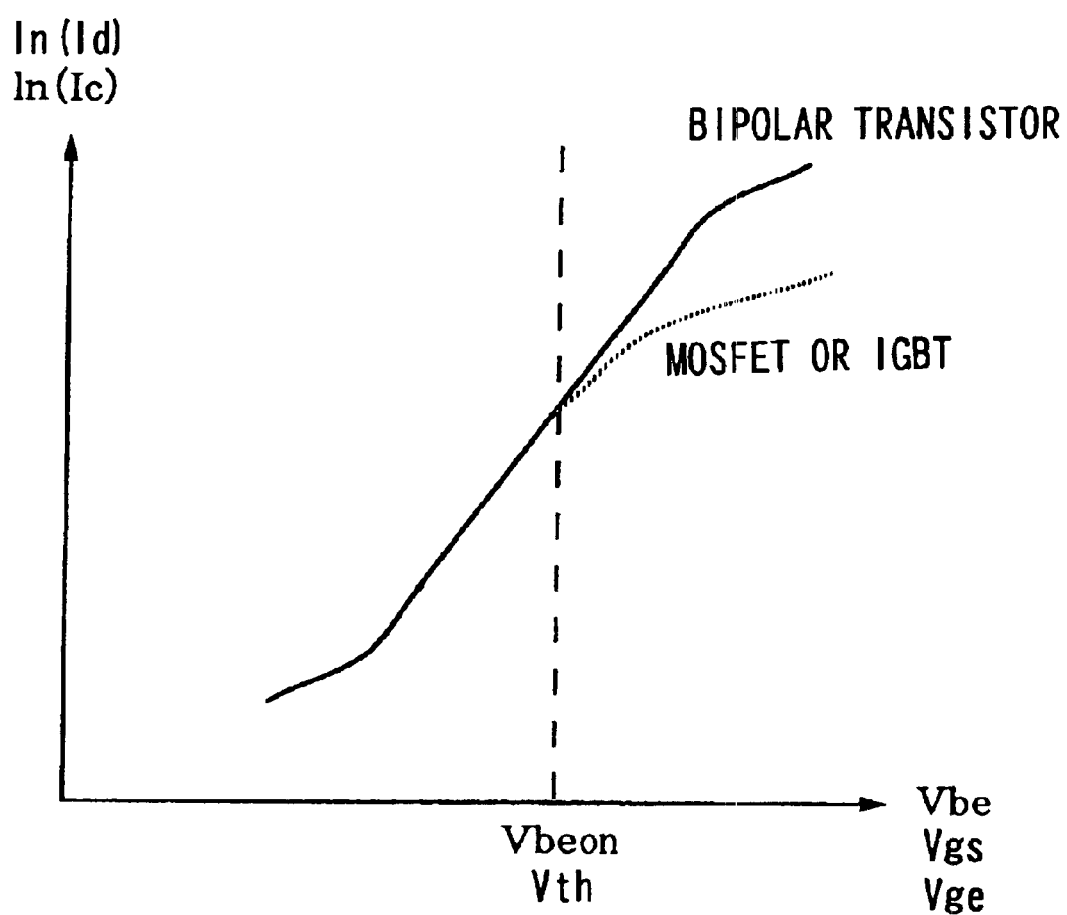
FIG. 2 is a graph showing the relationship between a collector current and a control voltage (voltage between a base and an emitter) Vbe during the operation of the circuit according to the first preferred embodiment shown in FIG. 1.

There are the following two problems with the first preferred embodiment of the present invention described above. The first such problem is that, as shown in the current-voltage characteristic of FIG. 2, the above Equation (1) is only valid over a comparatively small current range, and in particular, in the region where the current becomes large, the influence of parasitic resistance and the like becomes prominent, and the deviation from the equation becomes great. Furthermore, the second problem is that, as will be understood from the explanation of the temperature estimation calculation given above, this calculation for temperature estimation is complicated, and accordingly a calculation device of high processing power is required for performing it.

In addition to the above described problems, the first preferred embodiment can only be applied to a bipolar type transistor, so that its range of application is relatively limited. On the other hand, with an IGBT (Insulated Gate type Bipolar Transistor) or a power MOSFET or the like, as shown by the dotted line in FIG. 2, although the deviation from Equation (1A) or Equation (1B), which is described below and similar to Equation (1), is large in the region in which its control voltage (gate voltage, Vgs or Vge in the figure) is greater than the threshold voltage (Vth in the figure), on the other hand, it is possible to estimate the temperature in the range in which Vgs or Vge is less than Vth, since Equation (1A) or Equation (1B) is valid.

$$Id = Is \cdot \exp(qVgs/nkT) \quad \text{(1A) for MOSFET}$$

$$Id = Is \cdot \exp(qVge/nkT) \quad \text{(1B) for IGBT}$$

Figure 3:
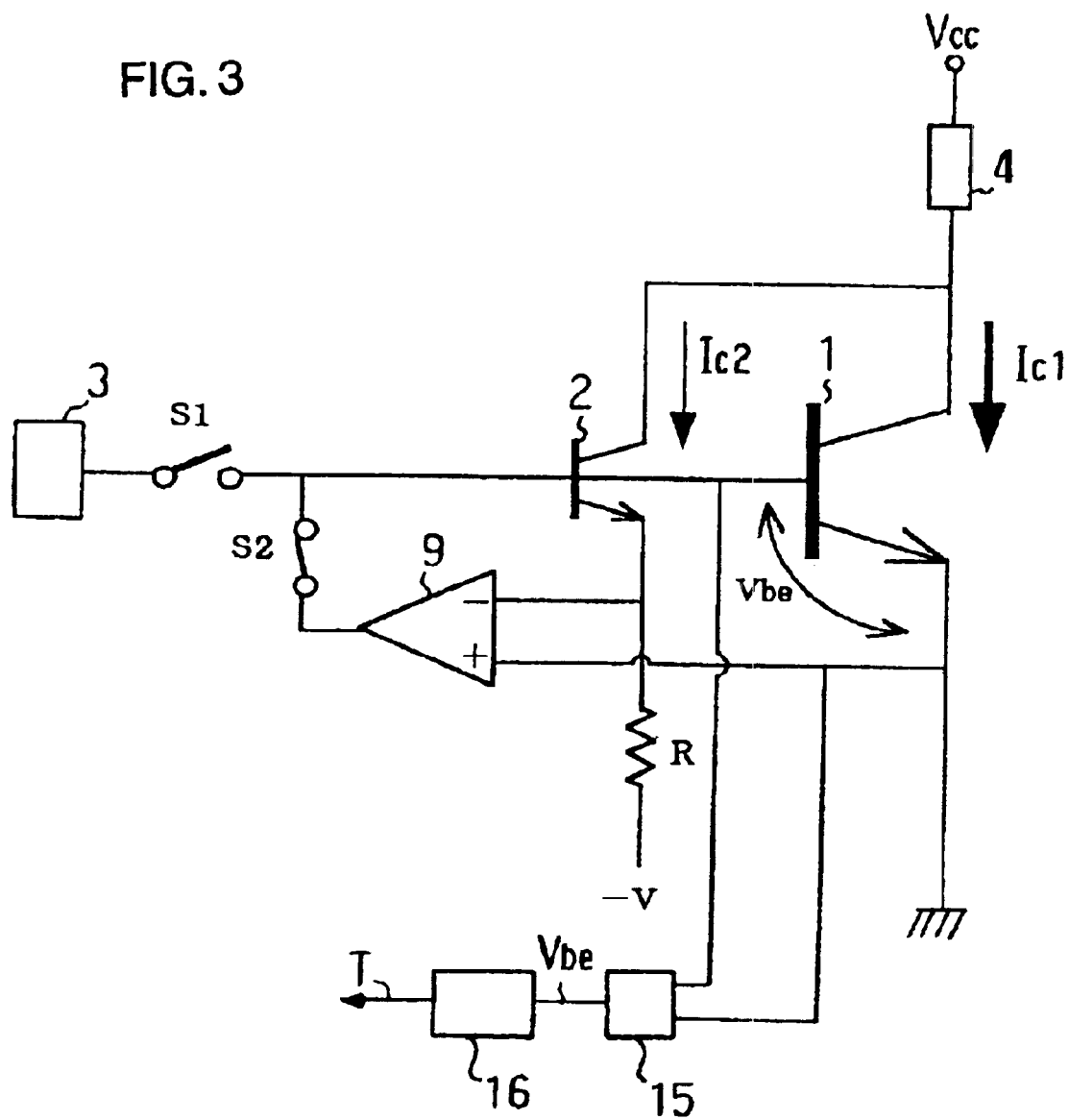
FIG. 3 is a circuit diagram showing the structure of a second preferred embodiment of the present invention.

FIG. 3 is a circuit diagram showing a second preferred embodiment of the present invention. In this figure, the reference symbol 9 denotes an op amp (operational amplifier), while 16 denotes a temperature calculation section, S1 and S2 are switches, and −V is a negative voltage source which takes the emitter of the power transistor 1 as a reference; and the other elements are the same as ones in FIG. 1 and are denoted by the same reference symbols. It should be understood that the comparator 8 of FIG. 1 for excess current detection is omitted in the figure (hereinafter the same for all the subsequent figures).

In this second preferred embodiment, during the time period in which the power transistor 1 is switching-off (hereinafter simply referred to as OFF), a minute predetermined electric current flows at its collector, and this is done in order to measure the control voltage Vbe at this time. To put it in another manner, this minute predetermined electric current is flowed without switching on the power transistor 1.

For temperature measurement, first the switch S1 is turned OFF and the switch S2 is turned ON. When this is done the emitter potential of the mirror transistor 2 becomes equal to the emitter potential of the power transistor 1 (=0V) due to the imaginary or virtual short at the op amp 9. As a result, a voltage V is applied to the current detection resistor R, and an electric current equal to V/R flows. This electric current (Ic2) flows to the mirror transistor 2, and furthermore an electric current (Ic1) proportional thereto flows in the power transistor 1. Since here it is possible to ensure that the electric currents (Ic1 and Ic2) which flow at this time have small values by setting the current detection resistor R to be large, accordingly it can be used in the range in FIG. 2 in which Vbe is smaller than Vbeon. Moreover, the voltage Vbe between the base and the emitter at this time has the same value for the power transistor 1 and the mirror transistor 2. The above described voltage Vbe between the base and the emitter is detected by the same method as explained above with reference to FIG. 1.

Figure 4:
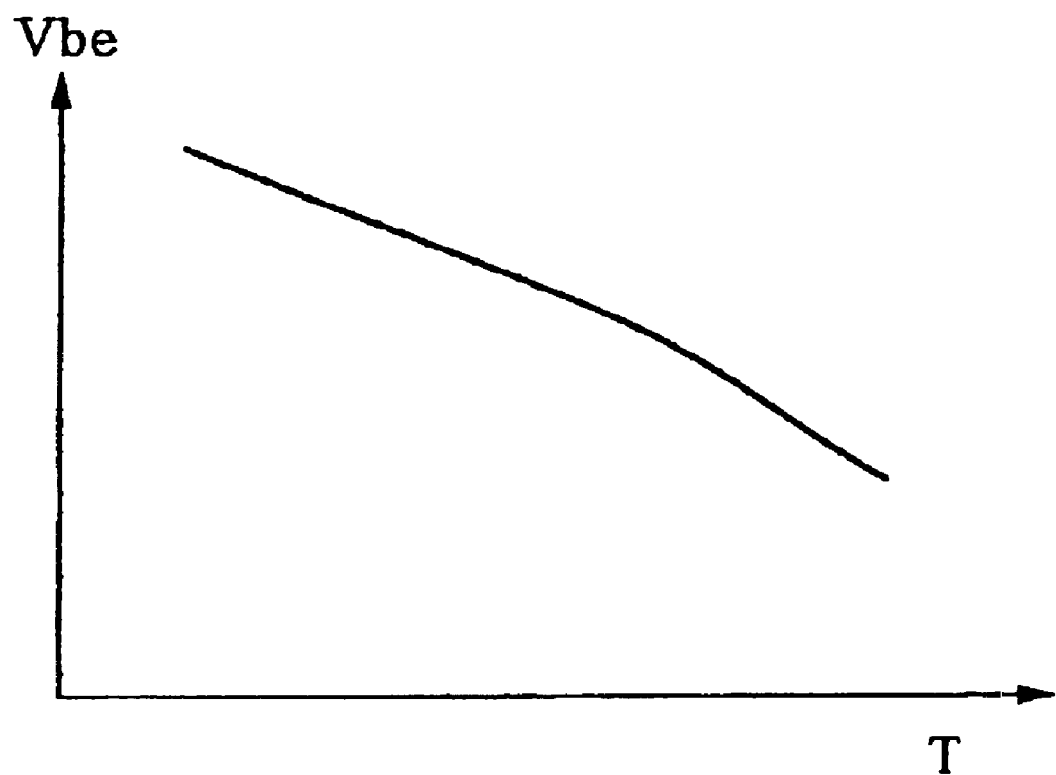
FIG. 4 is a graph showing the relationship between the control voltage Vbe between the base and the emitter and the chip temperature T during the operation of the circuit according to the second preferred embodiment shown in FIG. 3.

FIG. 4 is a figure showing the relationship between Vbe which has been measured as described above and chip temperature T. As shown in FIG. 4, Vbe shows a almost linear function of T, and for example is given by the approximate equation Vbe=αT+β, where α and β are constants. Accordingly in this case, just by obtaining Vbe, it becomes possible to calculate the chip temperature T from the above approximate equation, simply by using the four basic operations of arithmetic. The temperature calculation section 16 is a circuit or an item of software which performs the above described calculation so as to obtain the temperature T.

With the second preferred embodiment of the present invention as described above, just as in the case of the first preferred embodiment described above, it is possible to measure the chip temperature by using the mirror transistor which is used for excess current protection, even without providing any separate temperature measurement means such as a polysilicon diode or the like. As a result, the beneficial results are obtained that it is possible to reduce the ineffective surface area upon the power transistor, that it is possible to attach the main emitter wires sufficiently and densely, and that it is possible to eliminate the additional process for forming such a polysilicon element, and accordingly to avoid various problems which are caused by this additional process.

Furthermore, with this second preferred embodiment of the present invention, the influence of parasitic resistance and the like is small because the electric current is kept small, and accordingly the accuracy of temperature measurement becomes good, and moreover the specific benefit is obtained that it is possible to calculate the estimated temperature in a simple manner. Yet further, this second preferred embodiment can be applied to a power transistor such as a MOS or an IGBT, as well as to a bipolar type of power transistor, so that its range of application is relatively wide.

However, in the application of this second preferred embodiment, the following points must be accorded particular attention.

First, in this second preferred embodiment, the temperature can only be measured when the power transistor 1 is OFF. However, in the case of a circuit like a chopper, a converter, or an inverter, since the power transistor 1 is repeatedly turned ON and OFF at a predetermined rate (for example by PWM control), accordingly it is possible to implement a construction in which the measurement of temperature is performed only during the OFF period of the power transistor 1, and thus no problem arises, even though it is not possible to measure the temperature while the power transistor 1 is ON.

Furthermore, in this second preferred embodiment, a minute electric current is flowed to the collector of the power transistor 1 while it is OFF, in order to measure the temperature. Since a large voltage is applied to the collector of the power transistor 1 while it is OFF, a relatively high consumption of electrical power is entailed by the flow of the electric current even though it is minute. It is necessary to set the value of the current detection resistor R to be sufficiently great in order to reduce this useless power consumption as much as possible, and thereby the value of the electric current which flows for temperature measurement is minimized.

Third Embodiment

Figure 5:
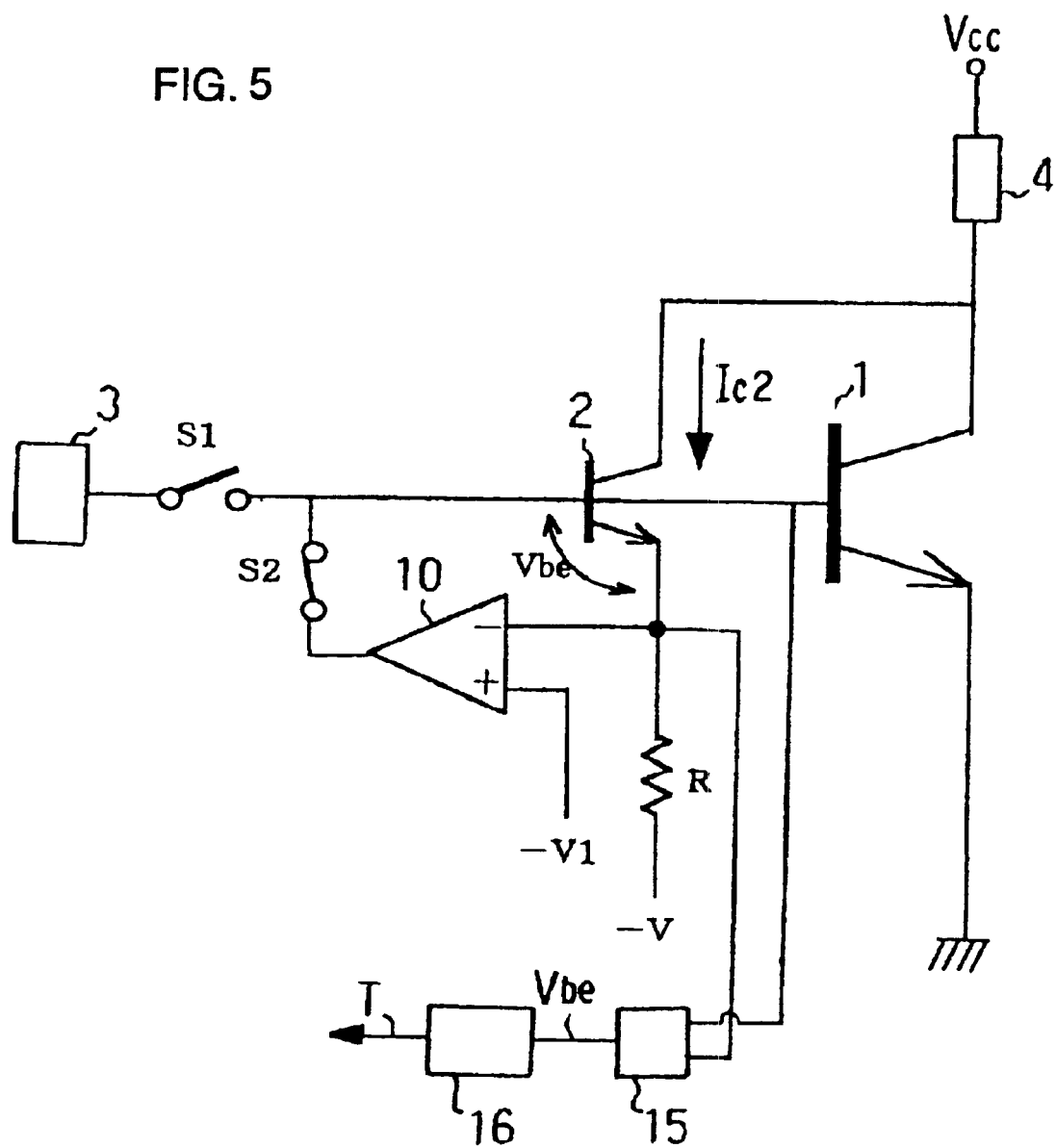
FIG. 5 is a circuit diagram showing the structure of a third preferred embodiment of the present invention.

FIG. 5 is a circuit diagram showing a third preferred embodiment of the present invention. In this figure, the reference symbol 10 denotes an op amp; and the other elements are the same as ones in FIG. 3 and are denoted by the same reference symbols. In this third preferred embodiment, a minute electric current flows to the collector of the power transistor 1 during the time period that it is OFF, and the control voltage Vbe (the voltage between the base and the emitter) of the mirror transistor 2 at this time is measured. However, in the case of this third preferred embodiment, the values of Vbe for the power transistor 1 and for the mirror transistor 2 are different.

In order to measure the temperature, first, the switch S1 is turned OFF and the switch S2 is turned ON. When this is done, the emitter potential of the mirror transistor 2 becomes equal to $-V1$ due to the imaginary short of the op amp 10, and as a result a voltage $(V-V1)$ is applied to the current detection resistor R, so that an electric current $(V-V1)/R$ flows therein. This electric current (Ic2) flows to the mirror transistor 2. If the current detection resistor R is set to be large, it is possible to ensure that the current which flows at this time is small, and it is possible to make the control voltage Vbe for the mirror transistor 2 shown in the figure to be less than a threshold value Vbeon. The relationship between Vbe measured in this manner and the chip temperature T is as shown in FIG. 4, and it is seen that Vbe has an almost linear function of T. Accordingly, in this case as well, in the same way as with the second preferred embodiment, it is possible to calculate the chip temperature T from Vbe by using simple arithmetic operations, that is the four basic operations of arithmetic, so that the same benefits are obtained as in the case of the second preferred embodiment, as described above.

In addition, in this third preferred embodiment, the voltage which is applied between the base and the emitter of the power transistor 1 becomes (Vbe−V1), which is different from the voltage Vbe between the base and the emitter of the mirror transistor 2. Here, by setting the voltage −V1 to be a sufficiently great negative voltage, it is possible to ensure that the voltage between the base and the emitter of the power transistor 1 is 0 V or is negative. By doing this, no electric current flows to the power transistor 1, even though electric current is flowing to the mirror transistor 2 for measuring the temperature, and accordingly it is possible to make the electric current which flows for measuring the temperature small. As a result, it is possible further to reduce the useless consumption of electrical power for measuring the temperature in this third preferred embodiment, as compared with the second preferred embodiment described above.

Fourth Embodiment

Figure 6:
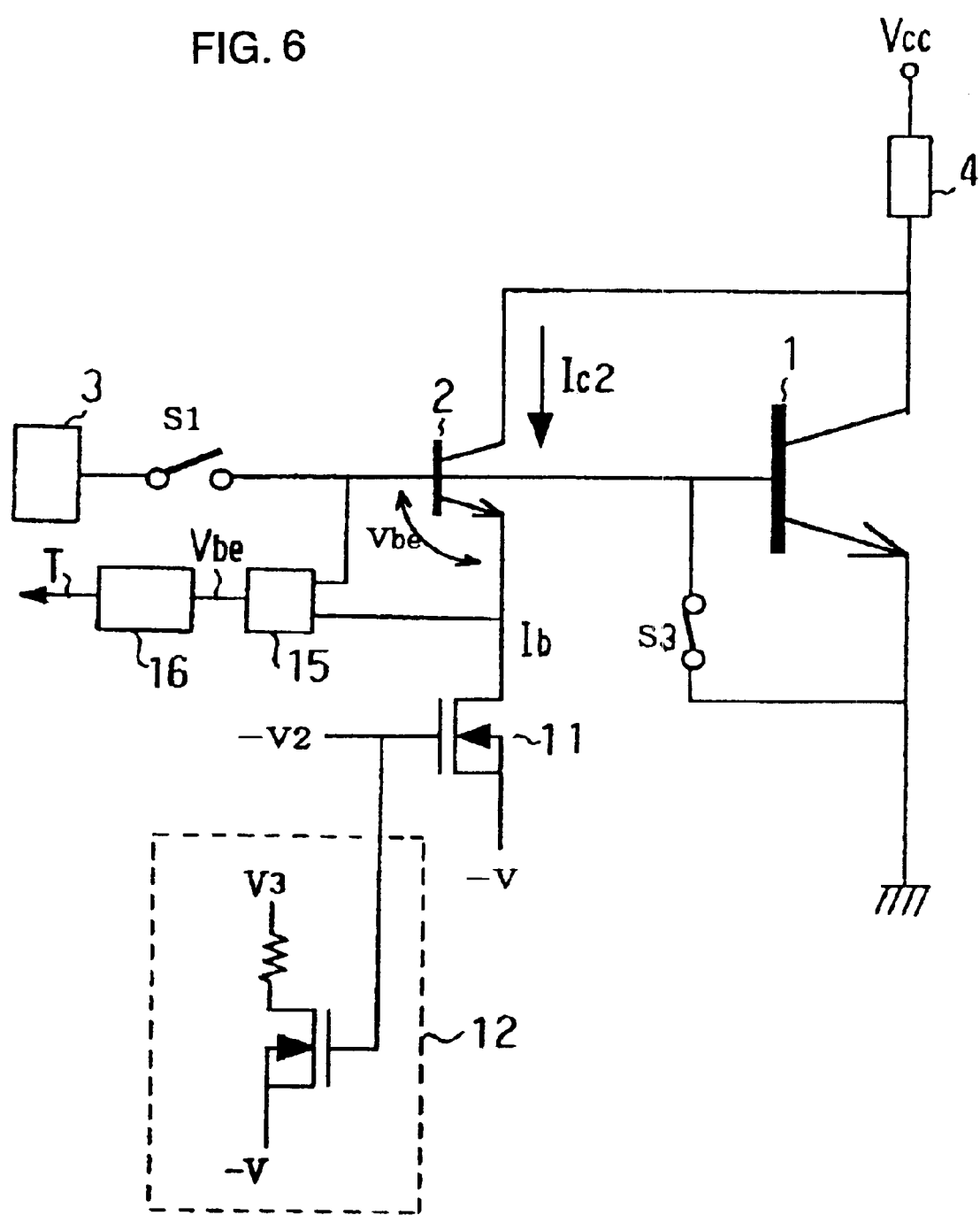
FIG. 6 is a circuit diagram showing the structure of a fourth preferred embodiment of the present invention.

FIG. 6 is a circuit diagram showing a fourth preferred embodiment of the present invention. In this figure, the reference symbol 11 denotes a MOSFET, S3 is a switch, and the portion 12 surrounded by the broken line is a voltage setting circuit which sets a voltage −V2. The other elements are the same as ones in FIG. 3 and are denoted by the same reference symbols.

In the circuit of FIG. 6, according to a method different from that of FIG. 5 above, during the time period that the power transistor 1 is OFF, a minute electric current flows only in the mirror transistor 2, and the control voltage Vbe at this time is measured.

In order to measure the temperature, first, in the same way as with the third preferred embodiment described above, the switch S1 is turned OFF and the switch S3 is turned ON. When the switch S3 is turned ON, the power transistor 1 goes OFF, and no electric current flows therethrough. A voltage (V−V2) is applied to the gate of the MOSFET 11. As a result, a constant electric current which is determined by the gate voltage flows in the MOSFET 11. This electric current flows to the mirror transistor 2. If the value of (V−V2) is set to be small, it is possible to ensure that the current which flows at this time is small, and it is possible to make the control voltage Vbe for the mirror transistor 2 to be less than the threshold value Vbeon. The relationship between Vbe measured in this manner and the chip temperature T is the same as that described above and shown in FIG. 4, and it is seen that Vbe has an almost linear function of T. Accordingly, in this case as well, in the same way as with the second and the third preferred embodiments, it is possible to calculate the chip temperature T from Vbe by using simple arithmetic operations such as the four basic operations of arithmetic, so that the same benefits are obtained as in the case of those embodiments, as described above.

Furthermore, in this case as well, just as with the third preferred embodiment described above, no current flows in the power transistor 1 even though current is flowing in the mirror transistor 2 for measuring the temperature, and accordingly it is possible to make the electric current which flows for measuring the temperature small, and it is possible to reduce the useless consumption of electrical power for measuring the temperature.

Yet further, in this fourth preferred embodiment, a difference as compared with the third preferred embodiment is that no feedback loop is established from the emitter of the mirror transistor 2 to its base. Accordingly, the stability and responsiveness of the circuit is better with this fourth preferred embodiment, than in the case of the third preferred embodiment.

Moreover it would also be acceptable, as an alternative, for the voltage (−V2) which is supplied to the gate of the MOSFET 11 in FIG. 6 to be provided from an external circuit not shown in the figure as shown by (−V2) in FIG. 6, but it is possible further to enhance the accuracy when the voltage setting circuit 12 which is surrounded by the broken line is employed. In other words, if a constant voltage −V2 is supplied from externally, then when the temperature varies the electric current Ib varies due to the temperature characteristics of the MOSFET 11, and there is a danger that the accuracy of temperature detection may be deteriorated. Due to this, if the voltage setting circuit 12 is formed on-chip using the same MOSFET as the MOSFET 11, then it is possible to maintain a constant electric current Ib even if the temperature changes, since the voltage −V2 changes in correspondence with the temperature change of the MOSFET 11.

Embodiment Five

Figure 7:
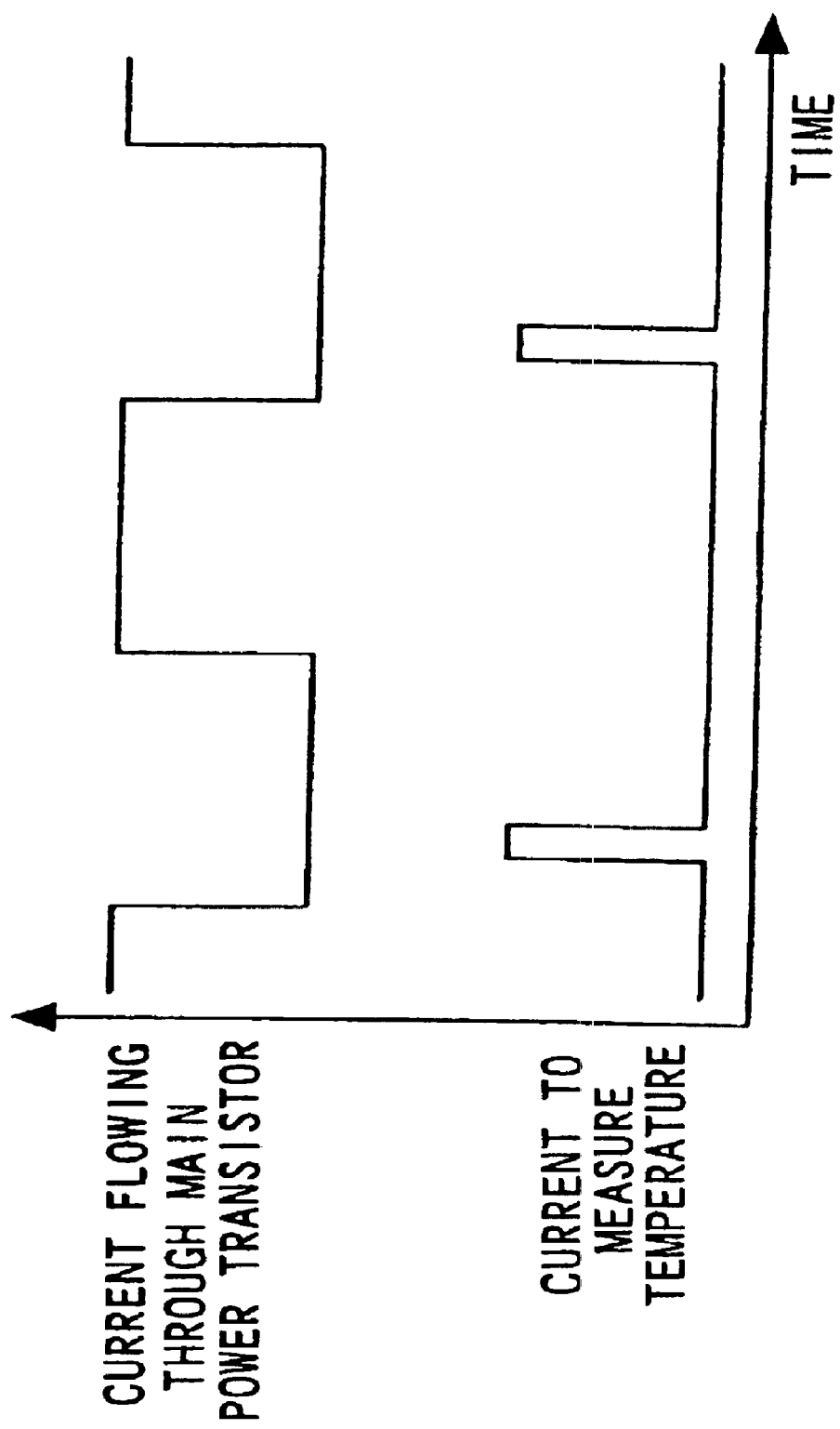
FIG. 7 is a timing chart for a fifth preferred embodiment of the present invention.

FIG. 7 is a figure showing a fifth preferred embodiment of the present invention, and is a timing chart showing temperature measurement for the second, third, and fourth preferred embodiments of the present invention. As described above, in each of these previously explained preferred embodiments, it is arranged for a minute electric current to flow to the collector of the mirror transistor 2 during the time period that the power transistor 1 is OFF, and the chip temperature is measured by measuring the control voltage Vbe at this time. The flow of current at this time represents a wastage of electrical power. With this fifth preferred embodiment, in order to eliminate all unnecessary wastage of electrical power, as shown in FIG. 7, when the power transistor 1 is OFF, the electrical current for measurement flows in the form of a short pulse, i.e. only over a predetermined short time period, and temperature measurement is not performed over the remainder of the time period when the power transistor 1 is OFF.

Sixth Embodiment

Figure 8:
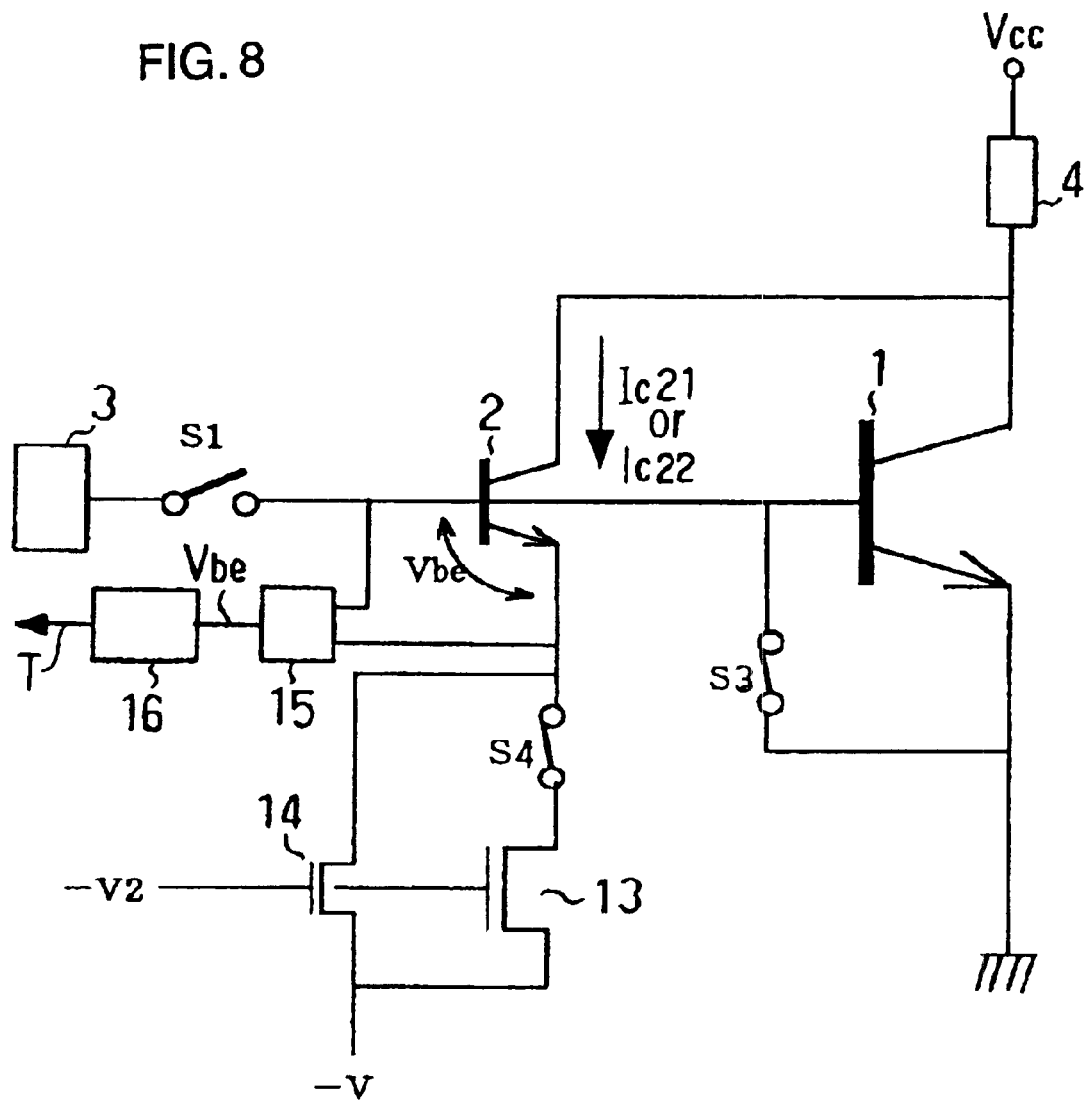
FIG. 8 is a circuit diagram showing the structure of a sixth preferred embodiment of the present invention.

FIG. 8 is a circuit diagram showing a sixth preferred embodiment of the present invention. In this figure, the reference symbols 13 and 14 denote MOSFETs, and S4 is a switch; and the other elements are the same as ones in FIG. 6 and are denoted by the same reference symbols.

The structure of this sixth preferred embodiment of the present invention shown in FIG. 8 is almost the same as that of the fourth preferred embodiment shown in FIG. 6, except for the point that the current Ic2 for temperature measurement of the fourth preferred embodiment is, in this sixth preferred embodiment, realized as two currents Ic21 and Ic22 of two types. The switch S4 is provided for switching between these two currents Ic21 and Ic22. If the control voltage when the current Ic21 is flowing is termed Vbe1 and the control voltage when the current Ic22 is flowing is termed Vbe2, then it is possible to calculate the temperature from their difference (Vbe1−Vbe2) by using Equation (2) below:

$$Ic21/Ic22 = \exp\{q(Vbe1-Vbe2)/nkT\} \quad (2)$$

As will be understood from Equation (2), the relationship between the ratio of the electric currents and the control voltage difference is determined only by the chip temperature and by various physical constants. Accordingly, the measurement of chip temperature T using this Equation (2) does not involve any deviations due to process or individual differences, so that it is thus possible to perform temperature measurement with high accuracy.

However, in order to apply this sixth preferred embodiment of the present invention, it is necessary to measure the voltage twice, which may take a certain amount of time. If this is inconvenient, it will be acceptable, for example, for the device to be structured so that when the power source is initially switched ON the temperature is measured using the relationship between electric current ratio and control voltage difference, a correction coefficient for compensating for individual variation or the like of the chip is calculated using this value and is saved, and thereafter, after this correction coefficient has been calculated, the temperature is calculated, for example, simply from the relationship between a single electric current and a single control voltage, in the same manner as in the fourth preferred embodiment described above and shown in FIG. 6.

Since as explained above, according to the present invention, it is arranged to detect the chip temperature by taking advantage of the mirror transistor which in any case is provided for the purpose of excess current detection, accordingly it becomes unnecessary to provide any special chip temperature detection means such as a polysilicon diode, and thereby increase of the ineffective surface area upon the chip and increase of its cost are suppressed, and moreover it is possible to ensure that no negative influence is exerted by the provision of such a detection means upon the characteristics of the semiconductor element itself.

The present invention is not to be considered as being limited by the above described preferred embodiments; various details of the preferred embodiments disclosed could be varied, without departing from the spirit and scope of the present invention.

Figure 9:
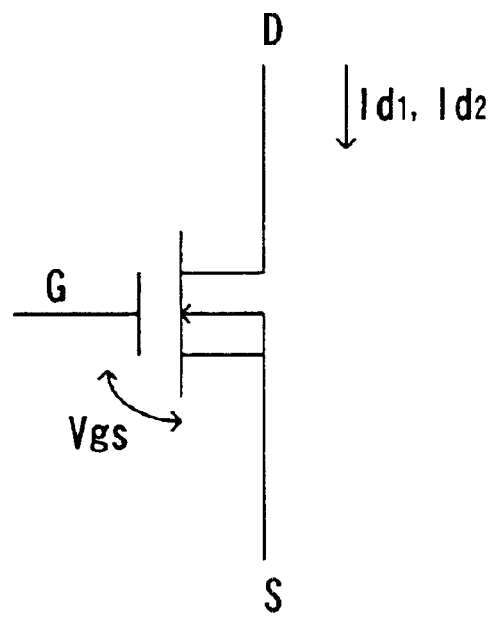
FIG. 9 is a figure showing a MOSFET.
Figure 10:
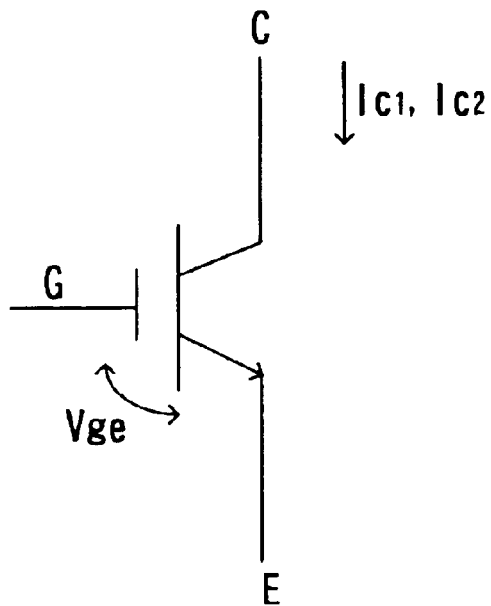
FIG. 10 is a figure showing an IGBT.

Thus, by way of example, in the above described preferred embodiments, the explanation was made in terms of the power transistor 1 being a NPN transistor; but this is not to be considered as being necessarily limiting. The present invention could also be applied to a power MOSFET or to an IGBT. In the case of application to a power MOSFET, the NPN transistors used for the above described power transistor 1 and mirror transistor 2 should be replaced by MOSFETs, as shown in FIG. 9. The voltage Vgs between the gate and the source in the FIG. 9 arrangement is to be considered as replacing the voltage Vbe between the base and the emitter in the previous description. In Equations (1) and (2), Ic and Vbe can be replaced with Id and Vgs. Furthermore, in the case of application to an IGBT, the NPN transistors used for the above described power transistor 1 and mirror transistor 2 should be replaced by IGBTS, as shown in FIG. 10. The voltage Vge between the gate and the emitter in the FIG. 10 arrangement is to be considered as replacing the voltage Vbe between the base and the emitter in the previous description. In Equations (1) and (2), Vbe can be replaced with Vge.

In the above described preferred embodiments of the present invention, all of the elements except the load 4 were formed on-chip. However, the present invention is not to be considered as being limited by this type of construction; it is actually only necessary for the power transistor 1 and the mirror transistor 2 to be formed on-chip. However, it is very desirable for the power transistor 1, the mirror transistor 2, and the resistor R to be formed on-chip.

It should be understood that the on-chip temperature detection device of the above described preferred embodiments can be used in any application where a power transistor is employed. For example, it can be used in a control system for an electric vehicle motor, or in a control system for a linear motor, or the like.

The disclosure of the following priority application is hereby incorporated herein by reference:
Japanese Patent Application No. 2001-90259, filed Mar. 27, 2001.

What is claimed is:

1. An on-chip temperature detection device, comprising:
    a bipolar type power transistor;
    a mirror transistor in which a collector current, which is proportional to a collector current of said power transistor, flows;
    a current detection section that detects the collector current of said mirror transistor;
    a voltage detection section that detects a voltage between a base and an emitter of said power transistor; and
    a calculation section that calculates a chip temperature of said power transistor, based upon the collector current of said mirror transistor detected by said current detection section, and upon the voltage between the base and the emitter of said power transistor detected by said voltage detection section.

2. An on-chip temperature detection device according to claim 1, wherein:
    a collector terminal of said power transistor and a collector terminal of said mirror transistor are connected together, and a base terminal of said power transistor and a base terminal of said mirror transistor are connected together; and
    an emitter terminal of said power transistor and an emitter terminal of said mirror transistor are provided independently.

3. An on-chip temperature detection device according to claim 1, wherein:
    said power transistor is driven by a first drive signal;
    a second drive signal generation circuit that generates a second drive signal which is a different signal from said first drive signal, and which drives said power transistor so that the voltage between the base and the emitter of said power transistor is less than a predetermined voltage, is further provided; and
    said calculation section calculates the chip temperature of said power transistor, based upon the collector current of said mirror transistor detected by said current detection section and upon the voltage between the base and the emitter of said power transistor detected by said voltage detection section, when said power transistor is being driven by said second drive signal.

4. An on-chip temperature detection device according to claim 3, wherein
    said second drive signal generation circuit generates said second drive signal so as to make an electrical potential of an emitter of said mirror transistor substantially equal to an electrical potential of the emitter of said power transistor.

5. An on-chip temperature detection device according to claim 3, wherein
    said second drive signal generation circuit outputs said second drive signal for a predetermined period when said first drive signal is OFF.

6. An on-chip temperature detection device, comprising:
    a power transistor that supplies a current based upon a drive signal;;
    a mirror transistor in which flows a current which is proportional to said current being supplied by and flowing in said power transistor;
    a current detection means for detecting said current flowing in said mirror transistor;
    a voltage detection means for detecting a voltage between a drive signal input terminal and a current supply terminal of said power transistor; and
    a calculation means for calculating a chip temperature of said power transistor, based upon said current detected by said current detection means and said voltage detected by said voltage detection means.

7. An on-chip temperature detection device, comprising:
    a bipolar type power transistor;
    a mirror transistor in which a collector current, which is proportional to a collector current of said power transistor, flows;
    a current detection section that detects the collector current of said mirror transistor; and
    a voltage detection section that detects a voltage between a base and an emitter of said power transistor; and a calculation section that calculates a chip temperature of said mirror transistor detected by said current detection section, and upon the voltage between the base and the emitter of said power transistor detected by said voltage detection section, using a saturation current of said power transistor defined by the chip temperature to be calculated.

* * * * *